(12) United States Patent
Takizawa et al.

(10) Patent No.: US 10,644,573 B2
(45) Date of Patent: May 5, 2020

(54) PERMANENT MAGNET MOTOR

(71) Applicant: Mitsubishi Electric Corporation, Tokyo (JP)

(72) Inventors: Yuji Takizawa, Tokyo (JP); Kentaro Urimoto, Tokyo (JP); Satoru Akutsu, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/772,851

(22) PCT Filed: Dec. 25, 2015

(86) PCT No.: PCT/JP2015/086317
§ 371 (c)(1),
(2) Date: May 2, 2018

(87) PCT Pub. No.: WO2017/109968
PCT Pub. Date: Jun. 29, 2017

(65) Prior Publication Data
US 2018/0323686 A1 Nov. 8, 2018

(51) Int. Cl.
*H02K 11/01* (2016.01)
*H02K 11/215* (2016.01)
(Continued)

(52) U.S. Cl.
CPC ............. *H02K 11/215* (2016.01); *H02K 1/16* (2013.01); *H02K 1/276* (2013.01); *H02K 3/12* (2013.01);
(Continued)

(58) Field of Classification Search
CPC ......... H02K 11/215; H02K 11/01; H02K 1/16
(Continued)

(56) References Cited

U.S. PATENT DOCUMENTS

2002/0180299 A1   12/2002   Oohashi et al.
2008/0197739 A1   8/2008   Nashiki
(Continued)

FOREIGN PATENT DOCUMENTS

CN    104167861 A    11/2014
EP    0751609 A2    1/1997
(Continued)

OTHER PUBLICATIONS

Communication dated Oct. 2, 2018 issued by the Japanese Patent Office in counterpart application No. 2017-557641.
(Continued)

*Primary Examiner* — Terrance L Kenerly
(74) *Attorney, Agent, or Firm* — Sughrue Mion, PLLC; Richard C. Turner (57) ABSTRACT

Provided is a permanent magnet motor including an armature, a rotor, and an angle detector. The angle detector includes a sensor magnet and a semiconductor sensor. The sensor magnet is magnetized into two poles and is provided in an end portion of a rotation shaft, and has the same rotation center as that of the rotation shaft. The semiconductor sensor is opposed to the sensor magnet in an extension direction of the rotation shaft. The semiconductor sensor and the sensor magnet have a gap formed therebetween, and a plate member made of a magnetic substance is provided between the semiconductor sensor and an end portion of the armature iron core on the semiconductor sensor side.

8 Claims, 7 Drawing Sheets

(51) Int. Cl.
  *H02K 1/16* (2006.01)
  *H02K 1/27* (2006.01)
  *H02K 3/12* (2006.01)
  *H02K 29/03* (2006.01)
  *H02K 11/33* (2016.01)
  *H02K 3/28* (2006.01)

(52) U.S. Cl.
  CPC ............... *H02K 11/01* (2016.01); *H02K 3/28* (2013.01); *H02K 11/33* (2016.01); *H02K 29/03* (2013.01)

(58) Field of Classification Search
  USPC .......................................................... 310/68 B
  See application file for complete search history.

(56) References Cited

U.S. PATENT DOCUMENTS

| | | |
|---|---|---|
| 2009/0236930 A1 | 9/2009 | Nashiki |
| 2013/0200742 A1 | 8/2013 | Seki et al. |
| 2014/0145564 A1 | 5/2014 | Taniguchi et al. |
| 2014/0253009 A1 | 9/2014 | Kimpara et al. |
| 2014/0339966 A1 | 11/2014 | Tomizawa et al. |
| 2015/0357892 A1 | 12/2015 | Nakano et al. |

FOREIGN PATENT DOCUMENTS

| | | |
|---|---|---|
| EP | 0 909 009 A1 | 4/1999 |
| EP | 2107669 A2 | 10/2009 |
| JP | 9-84321 A | 3/1997 |
| JP | 11-098791 A | 4/1999 |
| JP | 2002-354736 A | 12/2002 |
| JP | 2006-081283 A | 3/2006 |
| JP | 2011-101471 A | 5/2011 |
| JP | 2013-138592 A | 7/2013 |
| JP | 2013-153619 A | 8/2013 |
| JP | 2013-240259 A | 11/2013 |
| JP | 2014-107973 A | 6/2014 |
| JP | 5570884 B2 | 8/2014 |
| WO | 2015/186455 A1 | 12/2015 |

OTHER PUBLICATIONS

Communication dated Nov. 22, 2018, from the European Patent Office in counterpart European Application No. 15911402.4.
Internal Search Report for PCT/JP2015/086317 dated Mar. 22, 2016 [PCT/ISA/210].
Office Action dated Feb. 28, 2020, from the China National Intellectual Property Administration in Application No. 201580084953.3.

PERMANENT MAGNET MOTOR

CROSS REFERENCE TO RELATED APPLICATIONS

This application is a National Stage of International Application No. PCT/JP2015/086317 filed Dec. 25, 2015.

TECHNICAL FIELD

The present invention relates to a permanent magnet motor.

BACKGROUND ART

For example, in Patent Literature 1, there is disclosed a permanent magnet motor of a consequent pole type in which a sensor magnet is arranged on an end of a rotation shaft, and an angle detector including a semiconductor sensor of a magnetic resistance type is provided so as to be opposed to the rotation shaft in an axial direction. In this permanent magnet motor, it is intended to arrange a magnetic flux inductor made of a soft magnetic substance between a rotor of the consequent pole type and the semiconductor sensor so as to increase an angle detection precision.

CITATION LIST

Patent Literature

[PTL 1] JP 2014-107973 A

SUMMARY OF INVENTION

Technical Problem

In the permanent magnet motor of the consequent pole type, it is known that, in addition to a pseudo pole formed of a rotor core opposed to a gap to the armature for a magnetic pole of the permanent magnet opposed to the gap to the armature, there exists such a problem that a rotation shaft, which is a magnetic substance in contact with the rotor core, presents a polarity of an opposite pole. The rotation shaft end itself to which the sensor magnet is mounted serves as a magnet, and the angle detection precision is thus decreased by a leakage magnetic flux leaking from the rotation shaft end, and interlinking with the semiconductor sensor.

In the Patent Literature 1, it is intended to arrange the magnetic flux inductor formed of the soft magnetic substance between the rotor of the consequent pole type and the semiconductor sensor to guide the leakage magnetic flux of the rotor unique to the consequent pole so as to bypass the semiconductor sensor, to thereby reduce the leakage magnetic flux from the rotor end.

Meanwhile, in the permanent magnet motor including consequent poles, a magnetic flux generated by an armature winding leaks from the armature and interlinks with the semiconductor sensor, to thereby cause an armature leakage magnetic flux, which decreases the angle detection precision. This armature leakage magnetic flux flows from an outer periphery of the armature, horizontally penetrates the semiconductor sensor on a plane perpendicular to the rotation shaft, and flows into the outer periphery of the armature on an opposite side. Therefore, when a magnetic substance is arranged around the semiconductor sensor, a magnetic resistance around the semiconductor sensor is decreased, and the armature leakage magnetic flux is conversely concentrated around the semiconductor sensor, resulting in a problematic decrease in angle detection precision. The armature leakage magnetic flux is generated also in a permanent magnet motor of a non-consequent pole type, and thus reduction of the armature leakage magnetic flux is a common object for permanent magnet motors configured to detect the angle at the rotation shaft end.

The present invention has been made in view of the above-mentioned problem, and has an object to provide a permanent magnet motor capable of reducing an armature leakage magnetic flux.

Solution to Problem

In order to achieve the above-mentioned object, according to one embodiment of the present invention, there is provided a permanent magnet motor including an armature, a rotor, and an angle detector. The armature includes an armature iron core and an armature winding. The rotor includes a rotor iron core and a permanent magnet. The angle detector includes a sensor magnet and a semiconductor sensor. The rotor iron core including the permanent magnet is fixed to a rotation shaft. The sensor magnet is magnetized into two poles and is provided in an end portion of the rotation shaft, and has the same rotation center as a rotation center of the rotation shaft. The semiconductor sensor is opposed to the sensor magnet in an extension direction of the rotation shaft. The semiconductor sensor and the sensor magnet have a gap formed therebetween. A plate member made of a magnetic substance is provided between the semiconductor sensor and an end portion of the armature iron core on the semiconductor sensor side.

Advantageous Effects of Invention

According to the permanent magnet motor of the present invention, it is possible to reduce the armature leakage magnetic flux.

DESCRIPTION OF EMBODIMENTS

A description is now given of embodiments of the present invention with reference to the accompanying drawings. The same reference symbol is used to denote the same or corresponding component throughout the drawings.

First Embodiment

Figure 1:
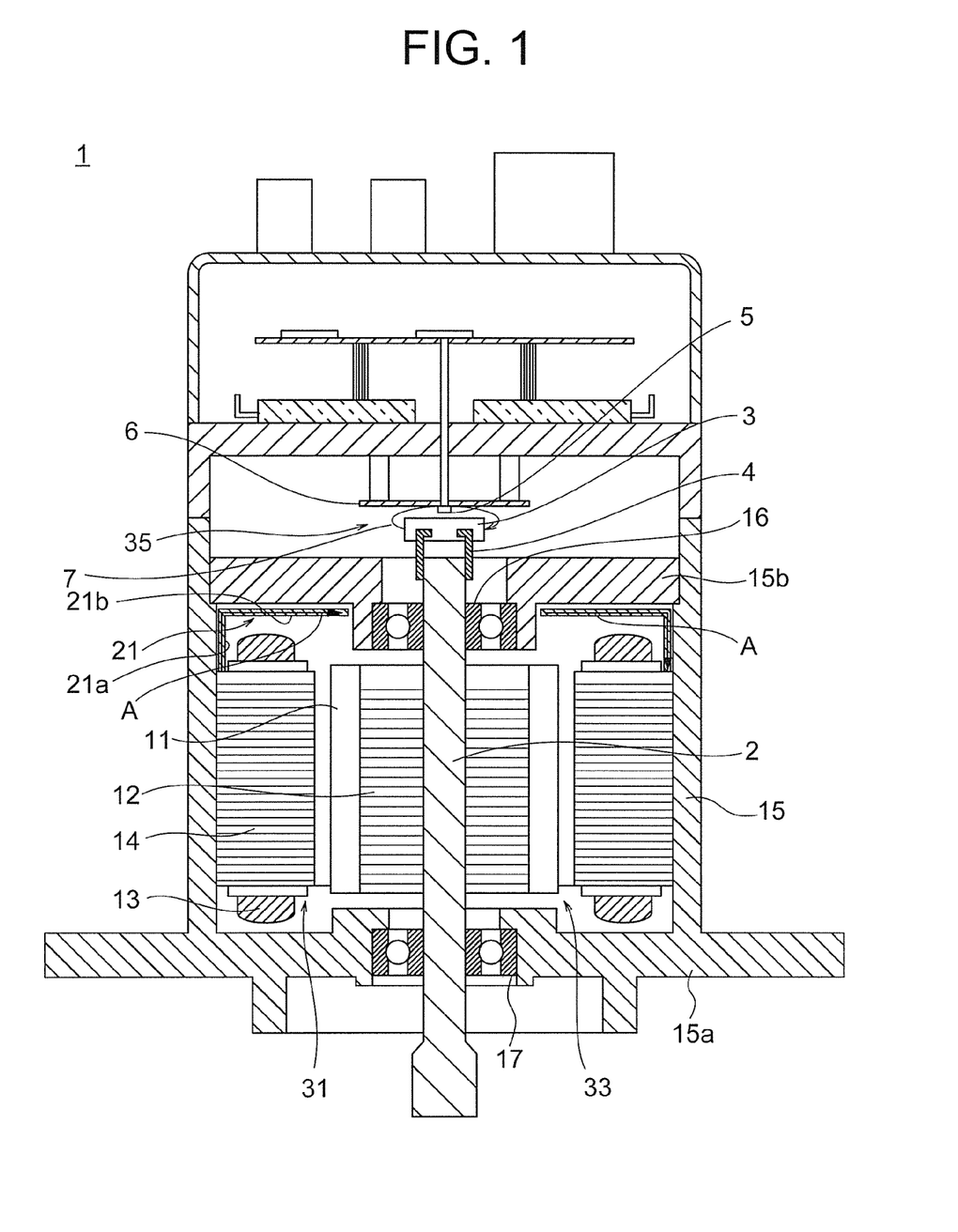
FIG. 1 is a diagram for illustrating a configuration of a permanent magnet motor according to a first embodiment of the present invention.

FIG. 1 is a diagram for illustrating a configuration of a permanent magnet motor according to a first embodiment of the present invention. The permanent magnet motor 1 is a multi-winding multi-phase AC motor, and includes an armature 31, a rotor 33, and an angle detector 35. The armature 31 includes an armature iron core 14 and an armature winding 13. The rotor 33 includes a rotor iron core 12 and permanent magnets 11. The angle detector 35 includes a sensor magnet 3 and a semiconductor sensor 5.

A holder 4 is fixed to one end of the rotation shaft 2 of the permanent magnet motor 1. The sensor magnet 3 is supported by the holder 4. The holder 4 and the sensor magnet 3 are supported by the rotation shaft 2 so as to rotate integrally with the rotation shaft 2.

The sensor magnet 3 is a cylindrical injection-molded neodymium bonded magnet. The sensor magnet 3 is magnetized into two poles. The sensor magnet 3 is integrally fixed to the rotation shaft through press fit or the like via the holder 4 made of a non-magnetic material, and is configured to rotate in synchronization with the rotation of the rotation shaft. In other words, the sensor magnet 3 is magnetized into two poles, is provided to an end portion of the rotation shaft 2, and has the same rotation center as that of the rotation shaft 2.

The semiconductor sensor 5 is arranged so as to be opposed to a top surface of the sensor magnet 3 of FIG. 1. The semiconductor sensor 5 is provided on the substrate 6. In other words, the semiconductor sensor 5 is opposed to the sensor magnet 3 in a direction in which the rotation shaft 2 extends, and a gap is formed between the semiconductor sensor 5 and the sensor magnet 3.

The semiconductor sensor 5 is a sensor of the magnetic resistance type. Other electronic components, wiring patterns, mounting holes constructing the angle detector only need to be publicly-known forms, and are not shown in the diagram. The semiconductor sensor 5 is configured to detect a rotation magnetic field direction in a direction parallel with a plane having the rotation shaft 2 as a perpendicular line, namely, a rotation magnetic field direction 7, which is a direction parallel with the substrate 6.

A rotor iron core 12 including the permanent magnets 11 corresponding to the number of poles is fixed to the rotation shaft 2. The rotor iron core 12 is configured to freely rotate in synchronization with the rotation of the rotation shaft 2. The permanent magnets 11 are arranged inside the rotor 33, that is, are embedded in the rotor iron core 12. A magnetic gap is secured between the rotor 33 and the armature 31.

The armature iron core 14 is arranged so as to be opposed to an outer periphery of the rotor 33. A plurality of magnetic teeth are provided in the armature iron core 14. The armature winding 13 constructed of a multi-phase winding group is wound on a plurality of teeth, and is stored in slots between the teeth. An outer periphery of the armature iron core 14 is mounted to an aluminum frame 15. The rotation shaft 2 is held in an extension direction of the rotation shaft of the frame 15 via a bearing 16 and a bearing 17. The bearing 16 is configured to rotatably hold the one end of the rotation shaft 2, that is, the end portion of the rotation shaft 2 in which the angle detector 35 is provided. The bearing 17 is configured to rotatably hold the other end of the rotation shaft 2. The other end of the rotation shaft 2 protrudes to an outside of the frame 15. The frame 15 is separated into two components, which are a section 15a in a cylindrical shape in contact with the armature iron core 14 and a section 15b in a disc shape to which the bearing 16 is mounted.

A plate member 21 made of a ferromagnetic substance is provided between the semiconductor sensor 5 and an end portion on the semiconductor sensor 5 side in the armature iron core 14. The plate member 21 is constructed of a thin plate made of a magnetic substance, which is a member separate from a section 15b of the frame 15 positioned between the angle detector 35 and the armature iron core 14 in an axial direction. The plate member 21 is in contact with an end surface of the armature iron core 14 directly or via a magnetic substance. In an example illustrated in FIG. 1, the plate member 21 is directly in contact with an outer most portion in a radial direction of the end surface on the semiconductor sensor 5 side.

The plate member 21 includes a first section 21a extending in the axial direction, and a second section 21b extending in an imaginary plane having a perpendicular line along the axial direction. The first section 21a extends from the armature iron core 14 in the axial direction so as to be away from the armature iron core 14. The second section 21b radially extends from a portion mostly separated from the armature iron core 14 in the first section 21a toward a radial inside. The plate member 21 is configured to extend in an L shape viewed on a cross section of FIG. 1. Moreover, in other words, the plate member 21 is configured to cover the end surface of the armature iron core 14 on the semiconductor sensor 5 side from a radially outer portion to a radially inner portion.

Figure 2:
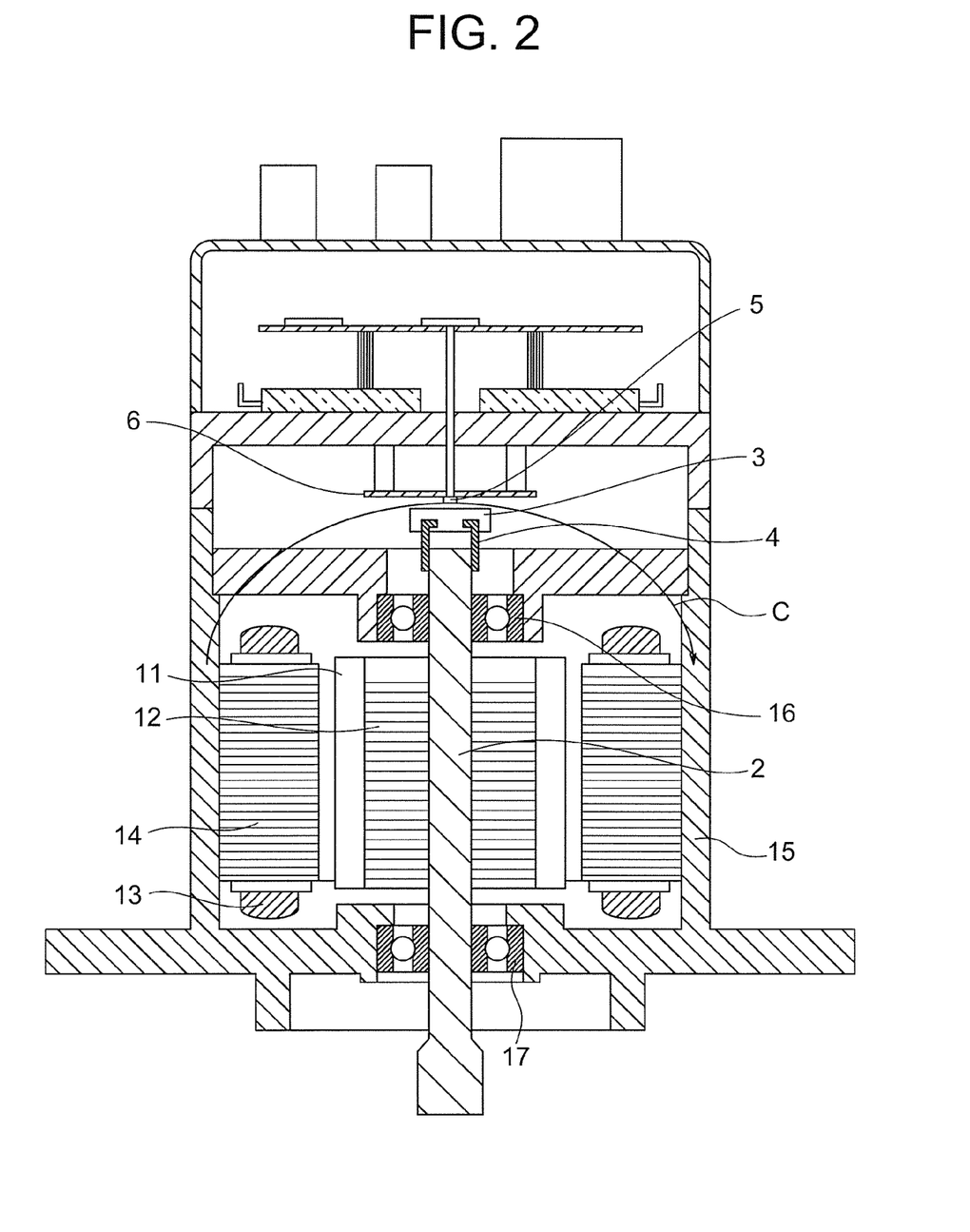
FIG. 2 is a diagram for illustrating a permanent magnet motor as an explanatory example for the present invention.

A description is now given of an action of the above-mentioned permanent magnet motor of the first embodiment. FIG. 2 is a diagram for illustrating a permanent magnet motor as an explanatory example for the present invention. In the permanent magnet motor of FIG. 2, the plate member 21 of the first embodiment is not provided. Therefore, as illustrated in FIG. 2, there poses such a problem that an armature leakage magnetic flux C flows from an armature outer periphery, penetrates the semiconductor sensor horizontally in a plane perpendicular to the rotation shaft, and flows into the armature outer periphery on the opposite side, resulting in a problematic decrease in angle detection precision. In contrast, in the first embodiment, the plate member 21 made of the magnetic substance is arranged so as to be in contact with the axial end of the armature iron core 14, and has such a shape as to cover the armature iron core 14 from the radially outer side to the radially inner side of the armature iron core 14. Therefore, an armature leakage magnetic flux A does not flow from the outer periphery of the armature 31 into the outer periphery of the armature 31 on the opposite side in such a manner as to cross the semiconductor sensor 5, but flows from the outer peripheral side of the armature 31 into the outer periphery of the armature 31 on the opposite side in such a manner as to route through the plate member 21. In other words, the armature leakage magnetic flux A is guided so as to bypass the semiconductor sensor 5. Therefore, a magnetic path, which is formed of the magnetic substance and guides the armature leakage magnetic flux from the armature outer periphery to the armature outer periphery on the opposite side, is added to the permanent magnet motor 1.

Figure 3:
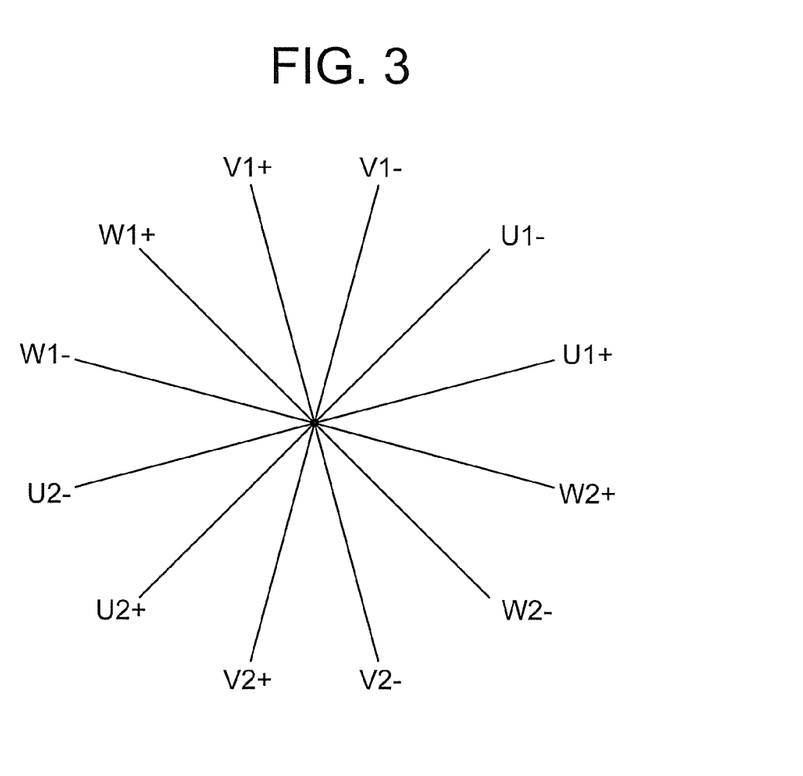
FIG. 3 is a schematic diagram for illustrating a winding arrangement of a 6-phase drive, 10-pole, and 12-slot type of the first embodiment.

A description is now given of a winding arrangement of the first embodiment. FIG. 3 is a schematic diagram for illustrating a winding arrangement of a 6-phase drive, 10-pole, and 12-slot type of the first embodiment. Windings for 6 phases of U1, V1, W1, U2, V2, and W2 for driving each set of two phases through a current in the same phase are wound on respective 12 slots of the armature 31. U1+ and U1− mean that winding directions are opposite to each other. Currents in the same phase are supplied to the two phases in each of sets of U1 and U2, V1 and V2, and W1 and W2.

Figure 4:
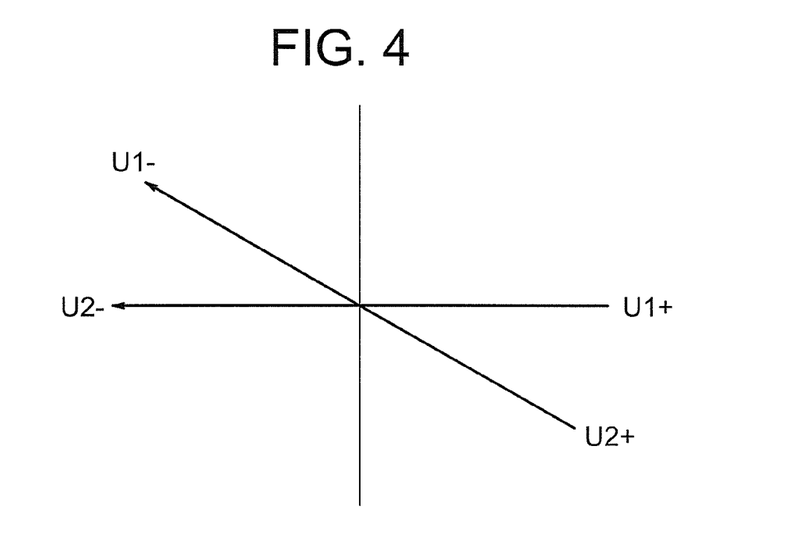
FIG. 4 is a diagram for illustrating armature leakage magnetic fluxes formed by U1 and U2 as angles in the electrical angle of the first embodiment.

FIG. 4 is a diagram for illustrating armature leakage magnetic fluxes formed by U1 and U2 as angles in the electrical angle of the first embodiment. In FIG. 4, directions of the armature leakage magnetic fluxes formed by the 2 phases having the same current supply phase flowing from the armature outer periphery to the armature outer periphery on the opposite side across the rotation shaft are indicated as the angles in the electrical angle. The magnetic fluxes are an armature leakage magnetic flux flowing from U1+ to U2−, and an armature leakage magnetic flux flowing from U2+ to U1−.

Figure 5:
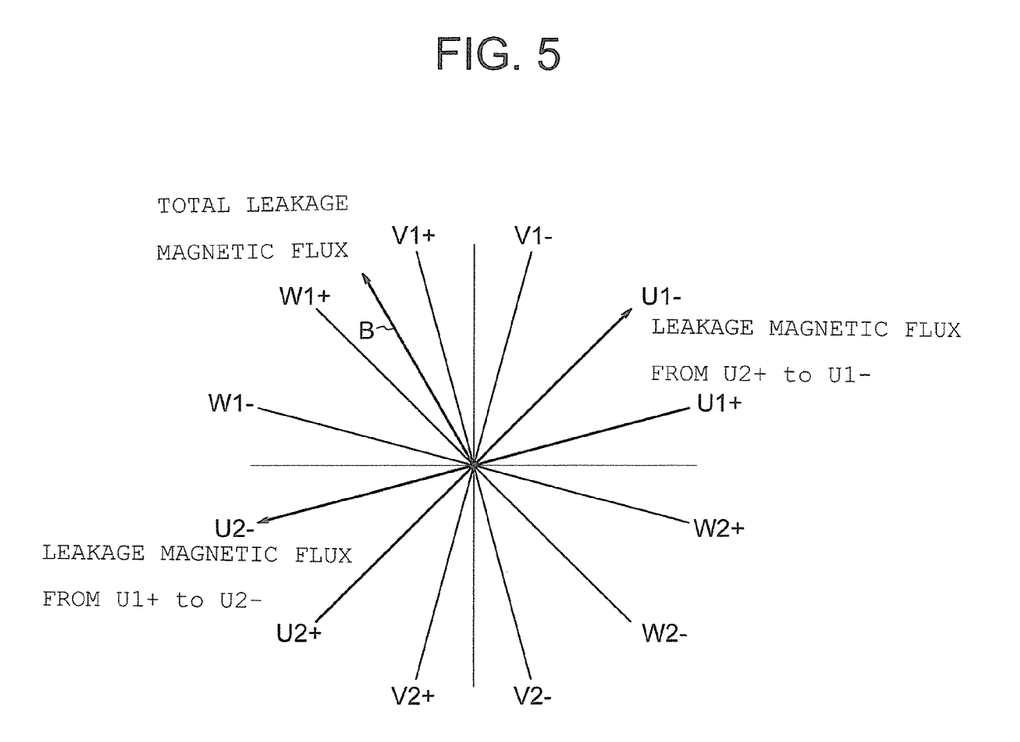
FIG. 5 is a diagram for illustrating a state in which the two armature leakage magnetic fluxes of FIG. 4 are superimposed on the winding arrangement of FIG. 3.

FIG. 5 is a diagram for illustrating a state in which the two armature leakage magnetic fluxes of FIG. 4 are superimposed on the winding arrangement of FIG. 3. In FIG. 5, a component B obtained by composing the two armature leakage magnetic fluxes is illustrated. In other words, the composed component B is the armature leakage magnetic flux indicated as A of FIG. 1 or C of FIG. 2 formed by the two phases U1 and U2, and rotates once while a magnitude thereof changes over one cycle in the electrical angle as the current supply phases change. When the armature leakage magnetic flux crosses the semiconductor sensor in the direction of detecting the magnetic field of the sensor magnet, an angle difference between the magnetic field of the sensor magnet and the armature leakage magnetic flux corresponds to an error in the detected angle.

Second Embodiment

Figure 6:
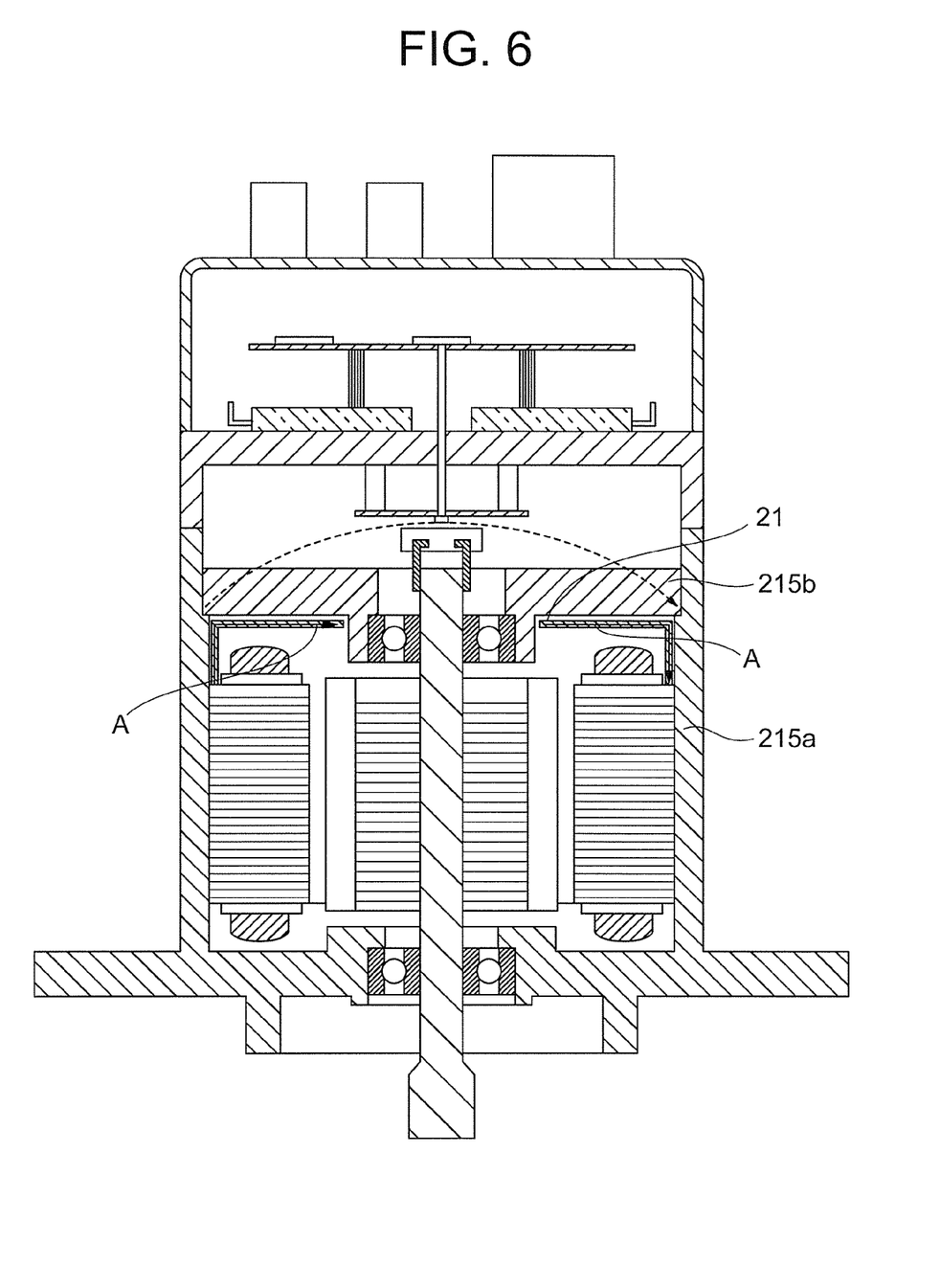
FIG. 6 is a diagram for illustrating a configuration of a permanent magnet motor according to a second embodiment of the present invention.

A description is now given of a second embodiment of the present invention. In the second embodiment, apart except for the one described below is the same as that of the first embodiment. FIG. 6 is a diagram for illustrating a configuration of a permanent magnet motor according to a second embodiment of the present invention. In the second embodiment, the section 215*a* in a cylindrical shape in contact with the armature iron core in the frame is formed of a magnetic substance. As compared with the aluminum cylindrical frame in the first embodiment, the weight increases, but sufficient strength is provided while a plate thickness is decreased, and thus noise and vibration during drive of the motor can be decreased for a small outer diameter. Moreover, in the second embodiment, an aluminum frame section 215*b* in a disc shape, to which the bearing is mounted, can advantageously be used as a heatsink by arranging an inverter on a rear surface of the frame.

When the plate member 21 is not provided, the cylindrical frame made of the magnetic substance is in contact with the armature iron core. Thus, as indicated by the dotted line, the armature leakage magnetic flux flows from the armature outer periphery, routes through a radially inner portion of the frame, crosses the rotation shaft, routes through the radially inner portion of the frame on the opposite side, flows to the armature outer periphery on the opposite side, resulting in a decrease in angle detection precision. However, in the second embodiment, the plate member 21 is provided, and the plate member 21 made of the magnetic substance is arranged in contact with the cylindrical frame independently of the aluminum frame portion having the disc shape to which the bearing is mounted. Therefore, the armature leakage magnetic flux can be guided to the magnetic substance to bypass the semiconductor sensor. Thus, the effect of increasing the angle detection precision is provided.

The above-mentioned first and second embodiments are described in the case of the 6-phase drive, but it is apparent that the effect of increasing the angle detection precision can also be provided for a general permanent magnet motor of a three-phase drive, 10-pole, and 12-slot type in which U1 and U2, V1 and V2, and W1 and W2 are respectively configured as parallel circuits.

Third Embodiment

Figure 7:
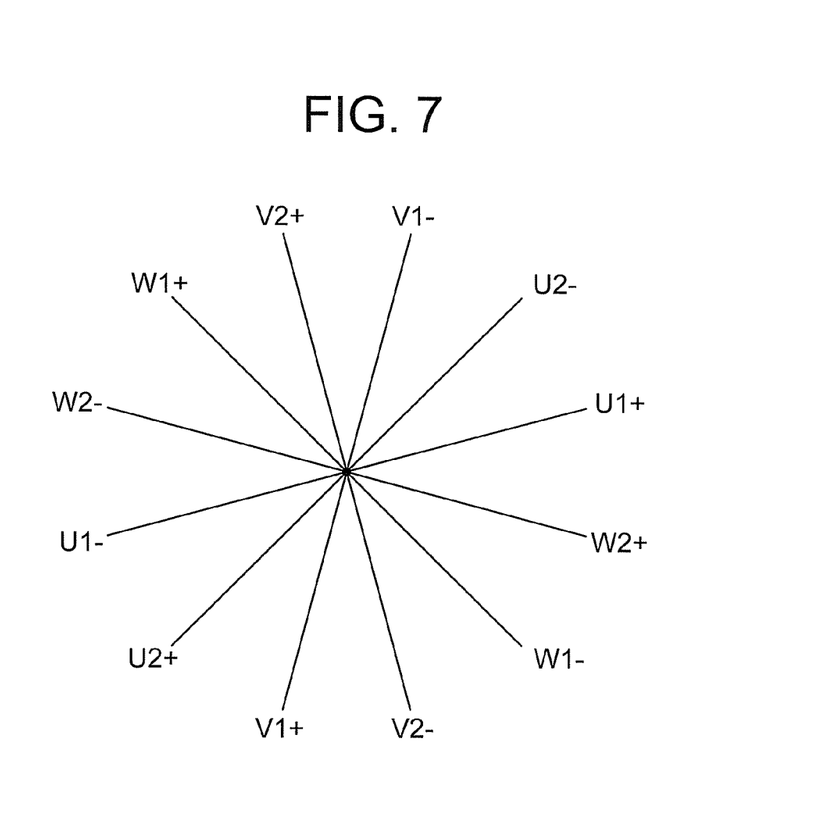
FIG. 7 is a schematic diagram for illustrating a winding arrangement of a 6-phase drive, 10-pole, and 12-slot type in a third embodiment of the present invention.

A description is now given of a third embodiment of the present invention. In the third embodiment, a part except for the one described below is the same as those of the first and second embodiments. FIG. 7 is a schematic diagram for illustrating a winding arrangement of the 6-phase drive, 10-pole, and 12-slot type of the third embodiment. The third embodiment has a winding arrangement of the 6-phase drive, 10-pole, and 12-slot type in which the two phases of the above-mentioned first embodiment are driven through currents having the phase difference of 30 degrees.

The windings of the 6 phases of U1, V1, W1, U2, V2, and W2 are wound on respective 12 slots. U1+ and U1− mean that winding directions are opposite to each other. The currents having the phase difference of 30 degrees are supplied to the two phases in each of the sets of U1 and U2, V1 and V2, and W1 and W2, which is common in a double three-phase motor configured to cancel a torque ripple of 6f through the phase difference of 30 degrees.

Figure 8:
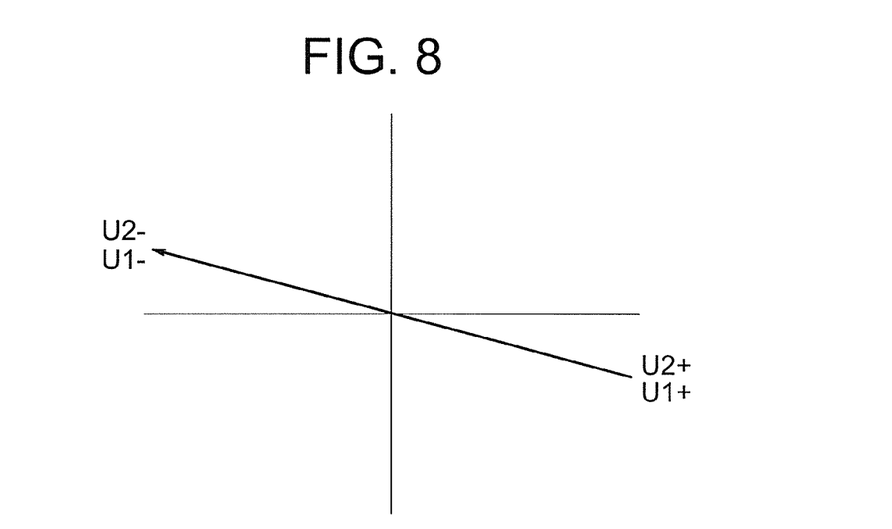
FIG. 8 is a diagram for illustrating the armature leakage magnetic fluxes formed by U1 and U2 as the angles in the electrical angle of the third embodiment.

FIG. 8 is a diagram for illustrating the armature leakage magnetic fluxes formed by U1 and U2 as the angles in the electric angle of the third embodiment. In FIG. 8, directions of the armature leakage magnetic fluxes, which are formed by the 2 phases different in the current supply phases by 30 degrees flowing from the armature outer periphery to the armature outer periphery on the opposite side across the rotation shaft, are indicated as the angles in the electrical angle. In other words, the magnetic fluxes are an armature leakage magnetic flux flowing from U1+ to U2−, and an armature leakage magnetic flux flowing from U2+ to U1−. The phases of the angles in the electrical angle of the two armature leakage magnetic fluxes are the same.

Figure 9:
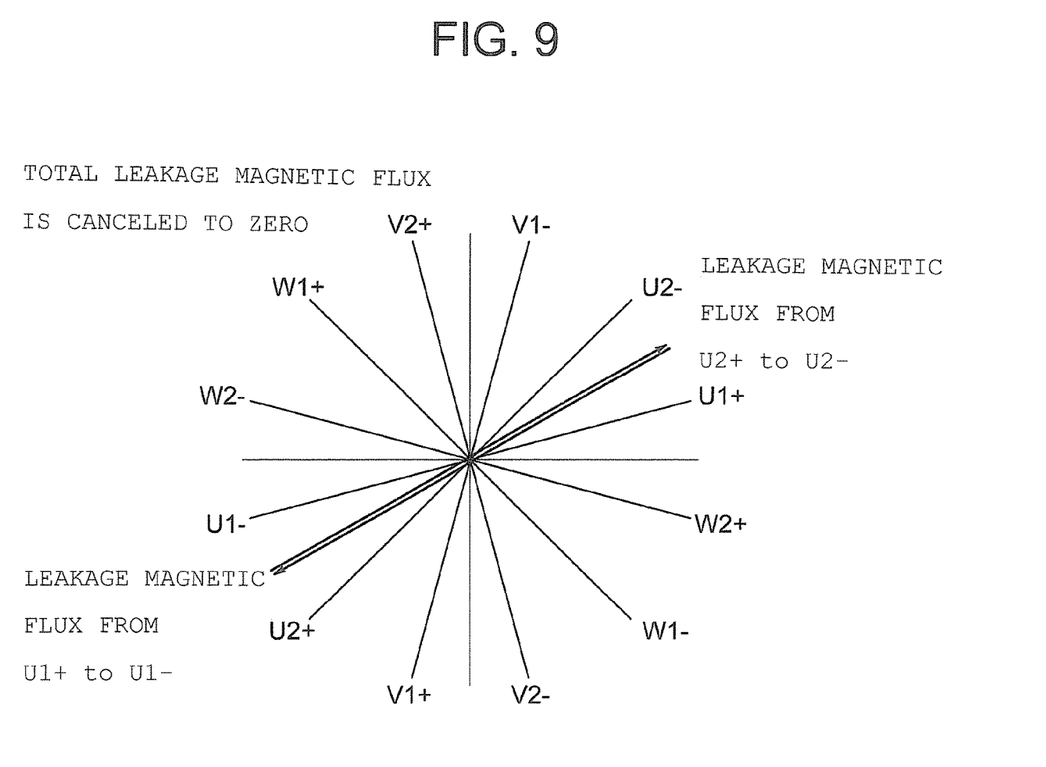
FIG. 9 is a diagram for illustrating the armature leakage magnetic fluxes of FIG. 8 on the winding arrangement of FIG. 7.

FIG. 9 is a diagram for illustrating the armature leakage magnetic fluxes of FIG. 8 on the winding arrangement of FIG. 7. U1+ and U2− are arranged so as to form 30 degrees in the mechanical angle, and thus U1+ and U2− form an angle of 150 degrees in the electrical angle and further form an angle of 180 degrees due to the phase difference of 30 degrees between the currents. However, U1+ and U2− have the winding directions opposite to each other, and thus the phase difference between the two armature leakage magnetic fluxes is 0 degree in the electrical angle, that is, U1+ and U2− have the same phase. As illustrated in FIG. 9, the leakage magnetic fluxes are in the directions canceling each other in the mechanical angle in consideration of the winding directions. From an opposite view point, this is equivalent to a fact that U1 and U2 have the same angles when the angles of the supply currents have the phase difference of 30 degrees, but the directions are opposite to each other due to the winding arrangement of U1 and U2. Thus, in the normal 6-phase drive, the armature leakage magnetic fluxes cancel one another, and are thus zero. However, the third embodiment corresponds to a case where the current supply to U1, V1, and W1 is shut off, and the motor is driven only through U2, V2, and W2. This corresponds to a case where two inverters supply currents to the respective groups, and when the current supply to one group is turned off due to abnormality of the inverter or the winding, the drive by the other group is continued. On this occasion, the armature leakage magnetic fluxes do not cancel each other as illustrated in FIG. 9, and it is understood that the armature leakage magnetic fluxes cross the semiconductor sensor, and the angle detection error increases. Even in this case, the armature leakage magnetic fluxes crossing the semiconductor sensor can be guided for the bypassing by arranging the plate member 21 made of the magnetic substance of the first embodiment or the second embodiment, thereby providing the effect of increasing the angle detection precision.

In any of the first to third embodiments, the present invention can embody a permanent magnet motor of a 10-pole and 12-slot type in which the windings of the two phases of each of the sets of U1 and U2, V1 and V2, and W1 and W2 out of the six phases have the same number of turns, and are stored in the same slot. Also in this case, it is apparent that the effect of increasing the angle detection precision can be provided.

A specific description has been given of the content of the present invention with reference to the preferred embodiments, but it is apparent that a person skilled in the art can employ various modified forms based on the basic technical ideas and the teaching of the present invention.

The permanent magnet motor of the present invention is not limited to the 10-poles and 12-slot type magnet motor, and may be embodied, for example, as a 14-pole and 12-slot type magnet motor, or a 14-pole and 18-slot type magnet motor.

Regarding the above-mentioned respective embodiments, the present invention includes a combination of a part or an entirety of the configurations of one or more of the embodiments and other embodiments.

REFERENCE SIGNS LIST

1 permanent magnet motor, 2 rotation shaft, 3 sensor magnet, 5 semiconductor sensor, 11 permanent magnet, 12 rotor iron core, 13 armature winding, 14 armature iron core, 21 plate member, 31 armature, 33 rotor, 35 angle detector.

The invention claimed is:
1. A permanent magnet motor, comprising:
an armature;
a rotor; and
an angle detector,
wherein the armature includes:
an armature iron core; and
an armature winding,
wherein the rotor includes:
a rotor iron core; and
a permanent magnet
wherein the angle detector includes:
a sensor magnet; and
a semiconductor sensor,
wherein the rotor iron core including the permanent magnet is fixed to a rotation shaft,
wherein the sensor magnet is magnetized into two poles and is provided in an end portion of the rotation shaft, and has the same rotary axis as a rotary axis of the rotation shaft,
wherein the semiconductor sensor is opposed to the sensor magnet in an extension direction of the rotation shaft;
wherein the semiconductor sensor and the sensor magnet have a gap formed therebetween,
wherein a plate member made of a magnetic substance is provided between the semiconductor sensor and an end surface of the armature iron core, and
wherein the plate member comprises a first section extending in a axial direction from the end surface of the armature core toward the semiconductor sensor and a second section extending from the first section in a radial direction toward the rotary axis of the rotation shaft.

2. A permanent magnet motor according to claim 1, wherein the permanent magnet motor includes any one of a 10-pole and 12-slot type magnet motor, a 14-pole and 12-slot type magnet motor, and a 14-pole and 18-slot type magnet motor.

3. A permanent magnet motor according to claim 1, wherein the armature winding has six phases of U1, U2, V1, V2, W1, and W2 in which phases of supply currents are the same between two phases of each of sets of U1 and U2, V1 and V2, and W1 and W2.

4. A permanent magnet motor according to claim 1, wherein:
the permanent magnet motor includes any one of a 10-pole and 12-slot type magnet motor and a 14-pole and 12-slot type magnet motor;
the armature winding has six phases of U1, U2, V1, V2, W1 and W2 in which two phases of supply currents of each of sets of U1 and U2, V1 and V2, and W1 and W2 have a phase difference of 30 degrees in an electrical angle; and
the permanent magnet motor is driven through current supply only to three phases of U2, V2, and W2 different in a phase of the supply current by 120 degrees from one another, without current supply to the other three phases.

5. A permanent magnet motor according to claim 1, wherein the armature winding has six phases of U1, U2, V1, V2, W1, and W2 in which the windings of the two phases of each of sets of U1 and U2, V1 and V2, and W1 and W2 have the same number of turns, and are stored in the same slot.

6. A permanent magnet motor according to claim 2, wherein the armature winding has six phases of U1, U2, V1, V2, W1, and W2 in which the windings of the two phases of each of sets of U1 and U2, V1 and V2, and W1 and W2 have the same number of turns, and are stored in the same slot.

7. A permanent magnet motor according to claim 3, wherein the armature winding has six phases of U1, U2, V1, V2, W1, and W2 in which the windings of the two phases of each of sets of U1 and U2, V1 and V2, and W1 and W2 have the same number of turns, and are stored in the same slot.

8. A permanent magnet motor according to claim 4, wherein the armature winding has six phases of U1, U2, V1, V2, W1, and W2 in which the windings of the two phases of each of sets of U1 and U2, V1 and V2, and W1 and W2 have the same number of turns, and are stored in the same slot.

* * * * *